(12) United States Patent
Hashimoto

(10) Patent No.: US 6,880,042 B2
(45) Date of Patent: Apr. 12, 2005

(54) DATA STORAGE APPARATUS THAT COMBINES A GROUP OF CONTINUOUS DATA SERIES STORED IN BUFFER SEPARATELY BEFORE STORING IN A RECORDING MEDIUM

(75) Inventor: Takeshi Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 10/121,077

(22) Filed: Apr. 12, 2002

(65) Prior Publication Data

US 2003/0110352 A1 Jun. 12, 2003

(30) Foreign Application Priority Data

Dec. 12, 2001 (JP) .................................. 2001-378426

(51) Int. Cl.⁷ .............................................. G06F 12/00
(52) U.S. Cl. ..................... 711/112; 711/113; 711/142; 711/143; 711/158
(58) Field of Search ............................ 711/112, 113, 711/142, 143, 158, 133, 134

(56) References Cited

U.S. PATENT DOCUMENTS 6,233,641 B1 * 5/2001 Graham et al. ............. 710/316

2001/0011323 A1 * 8/2001 Ohta et al. .................. 711/112
2003/0023815 A1 * 1/2003 Yoneyama et al. ......... 711/133

FOREIGN PATENT DOCUMENTS

| JP | 4-287218 | 10/1992 |
| JP | 5-303528 | 11/1993 |
| JP | 10-63432 | 3/1998 |

* cited by examiner

Primary Examiner—Donald Sparks
Assistant Examiner—Ngoc V Dinh
(74) Attorney, Agent, or Firm—Greer, Burns & Crain, Ltd.

(57) ABSTRACT

A data storage apparatus that stores data series provided from an exterior system in a recording medium using a buffer memory to reduce the processing time of the data storage. The data series are temporarily stored in the buffer memory separately. If a group of the data series is determined to make a series of data as a whole, the group of the data series is combined, and transferred to the recording medium at one time in order to reduce seek time and rotation wait time from those that would be required if the group of the data series is transferred to the recording medium separately.

14 Claims, 7 Drawing Sheets

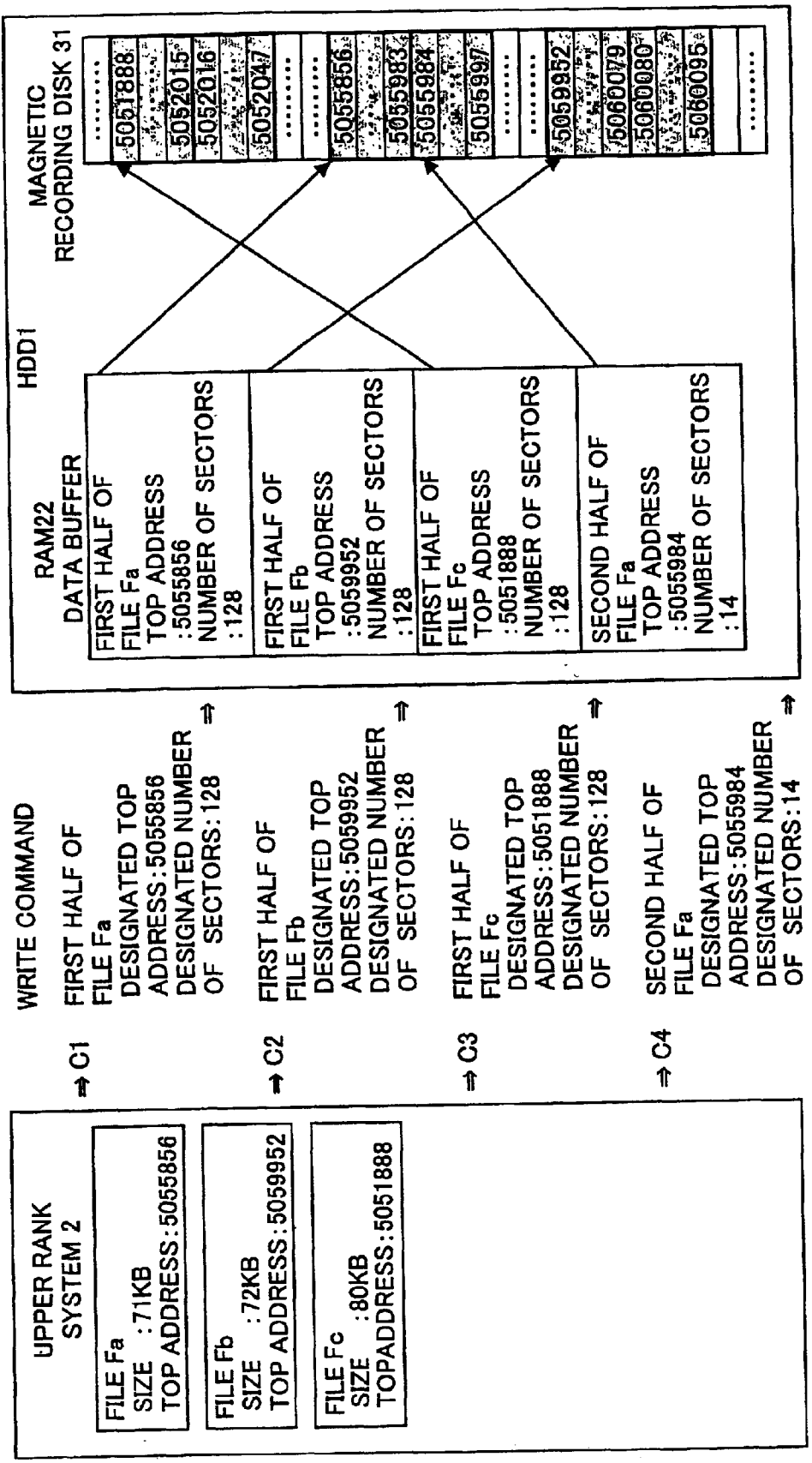

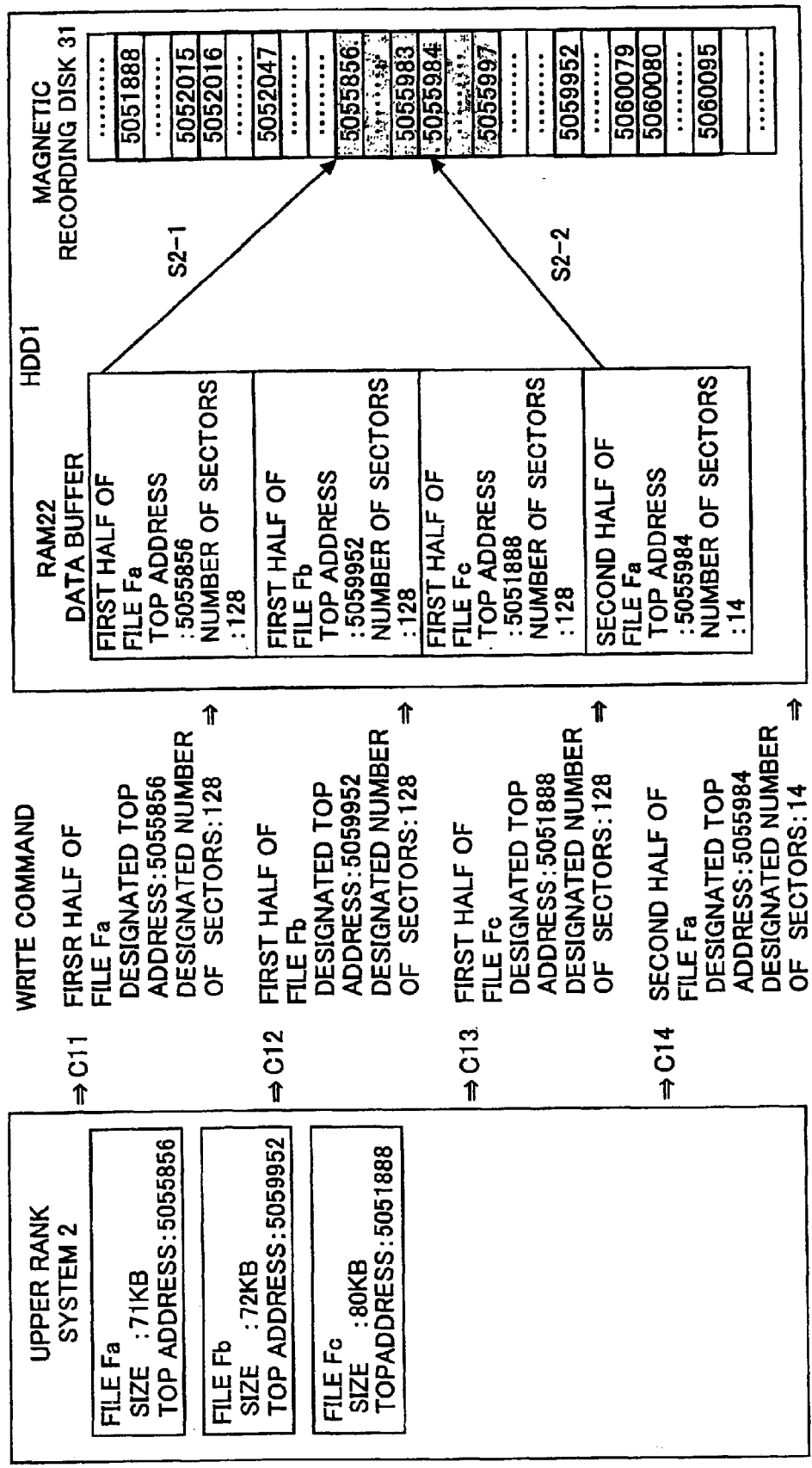

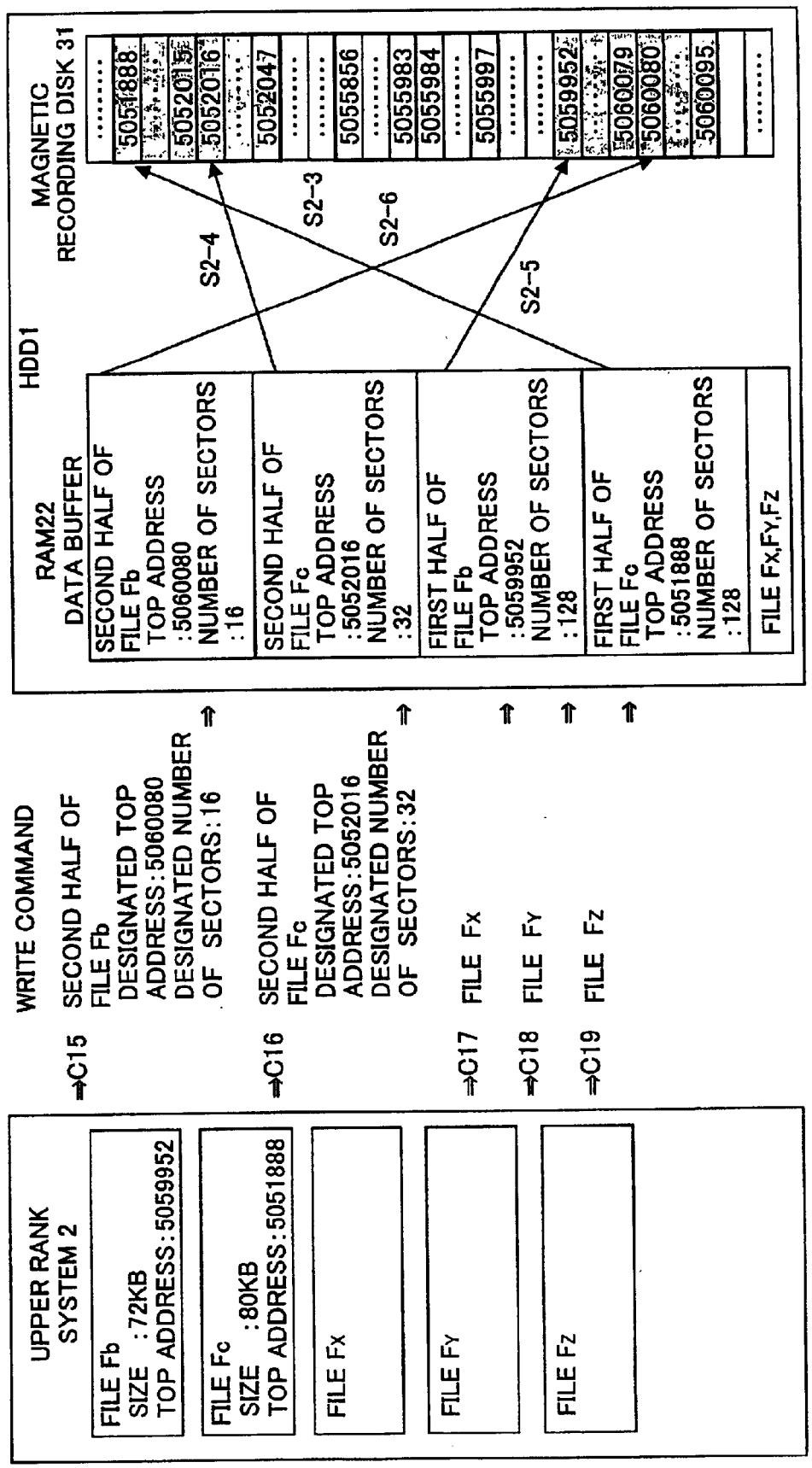

DATA STORAGE APPARATUS THAT COMBINES A GROUP OF CONTINUOUS DATA SERIES STORED IN BUFFER SEPARATELY BEFORE STORING IN A RECORDING MEDIUM

BACKGROUND OF THE INVENTION

1. Field of the Invention

The present invention generally relates to a data storage apparatus, a buffer controller, and a method of storing data, and more particularly, to a data storage apparatus that stores data provided from an exterior system in a recording medium after storing the data in a buffer temporarily, a buffer controller thereof, and a method of storing data used therein.

2. Description of the Related Art

A secondary storage device such as a hard disk drive of a computer usually has a buffer to store data temporarily before the data are stored in a recording medium (write cache function). The write cache function is one of key factors that determine the performance of the secondary storage device.

A hard disk drive will be described below as an example of a data storage apparatus having the write cache function.

FIG. 1 is a schematic drawing showing a hard disk drive, and FIG. 2 is a block diagram showing the hard disk drive.

A hard disk drive 1 is connected to an upper rank system 2, and stores, in response to a write command provided from the upper rank system 2, data transferred from the upper rank system 2 in a magnetic recording disk. The hard disk drive 1 also retrieves, in response to a read command provided from the upper rank system 2, the data stored in the magnetic recording disk, and transfers the data retrieved from the magnetic recording disk to the upper rank system 2. The hard disk drive 1 mainly consists of a circuit board 11 and a disk enclosure 12. The upper rank system is connected to the circuit board 11.

The circuit board 11 includes a hard disk drive controller (HDC) 21, random access memory (RAM) 22, a read channel (RDC) 23, a micro processing unit (MPU) 24, read only memory (ROM) 25, and a servo controller (SVC) 26. On the other hand, the disk enclosure 12 includes a magnetic recording disk 31, a spindle motor 32, a magnetic head 33, a voice coil motor 34, and a head IC 35.

The hard disk drive controller 21 is connected to MPU 24 and ROM 25 through a bus 27, and is controlled by a firmware program stored in ROM 25. The hard disk drive controller 21 is further connected to RAM 22 that is used as a cache memory to temporarily store the data exchanged between the hard disk controller 21 and the upper rank system 2.

According to the write cache function, the hard disk drive controller 21 transfers write data cached in RAM 22 to the read channel 23. The read channel 23 generates a recording signal by modulating the write data, and transfers the recording signal to the head IC 35.

The head IC 35 provides a current corresponding to the recording signal transferred from the read channel 23 to a magnetic head 33. The magnetic head 33 generates a magnetic field corresponding to the current provided by the head IC, and records the recording signal to the magnetic disk 31 by magnetizing the magnetic disk 31.

On the other hand, the magnetic head 33 converts a magnetization of the magnetic disk 31 into a current, and provides the current to the head IC 35. The head IC 35 generates a reproduced signal corresponding to the current, and transfers the reproduced signal to the read channel 23.

The read channel 23 reproduces read data by demodulating the reproduced signal, and transfers read data to the hard disk controller 21. The hard disk controller 21 caches the read data in RAM 22, and transfers the read data to the upper rank system 2.

The read channel 23 obtains a servo signal from the reproduced signal, and provides the servo signal to MPU 24. MPU 24 controls the entire system of the hard disk drive 1 by executing the firmware stored in ROM 25. MPU 24 controls the servo controller 26 using the servo signal provided from the read channel 23. The servo controller 26 controls, in response to the control signal provided from MPU 24, the spindle motor 32 and the voice coil motor 34.

The write cache function performed by the hard disk drive controller 21 will be described next.

The hard disk drive controller 21 caches write data transferred from the upper rank system 2 in RAM 22. Upon finishing the receiving of the write data from the upper rank system 2, the hard disk drive controller 21 informs the upper rank system 2 of the finish. The hard disk drive controller 21 stores the write data cached in RAM 22 in the magnetic recording disk 31 when the cache memory is full. If a plurality of write data is to be stored at the same address of the magnetic recording disk 31, the write data buffered earlier are abandoned and only the write data buffered latest are recorded in the magnetic recording disk 31. If a plurality of write data, which makes a series of continuous data, is received separately using respective write commands, the write data are combined and stored in the magnetic recording disk 31 as one.

The write data are stored in the magnetic recording disk 31 in the order of an address of the write data instead of the order of receipt. The arranging of the write data based on the order to an address is called re-ordering. The reordering reduces useless seek operation of the magnetic head 33, and accordingly, improves the performance of storing the write data in the magnetic recording disk 31 (write performance).

The case in which three computer files each containing more than 64 KB (kilo bytes) are stored in the magnetic recording disk 31 is described next.

FIGS. 3A and 3B are schematic drawings showing the operation of the write processing.

The upper rank system 2 is operated by an operating system (OS) such as Windows, and is set not to store a file containing more than 64 KB, or 128 sectors. If the size of a file is more than 64 KB, but 128 KB or less, the operating system divides the file into two files, one containing data of 64 KB (128 sectors) and the other containing data of less than 64 KB, and issues two write commands. If the size of the file is more than 128 KB (256 sectors), the operating system divides the file into three files or more.

In FIGS. 3A and 3B, the upper rank system 2 has three files to be stored in the magnetic recording disk 31 of the hard disk drive 1. A file Fa contains data of 71 KB to be stored in a memory area starting with the address "5055856" in the magnetic recording disk 31. A file Fb contains data of 72 KB to be stored in a memory area starting with the address "5059952" in the magnetic recording disk 31. A file Fc contains data of 80 KB to be stored in a memory area starting with the address "5051888" in the magnetic recording disk 31.

Because the file Fa contains data of 71 KB, which is greater than 64 KB, the upper rank system 2 issues two write commands C1 and C4 to store the file Fa in the magnetic recording disk 31.

Since the file Fb contains data of 72 KB, which is greater than 64 KB, the upper rank system 2 issues two write commands C2 and C5 to store the file Fb in the magnetic recording disk 31.

Because the file Fc contains data of 80 KB, which is greater than 64 KB, the upper rank system 2 issues two write commands C3 and C6 to store the file Fc in the magnetic recording disk 31.

The command C1 indicates the storing of write data of a designated number of sectors, "128", in a memory area starting from a designated address "5055856". The command C2 indicates the storing of write data of a designated number of sectors, "128", in a memory area starting from a designated address "5059952". The command C3 indicates the storing of write data of a designated number of sectors, "128", in a memory area starting from a designated address "5051888".

The command C4 indicates the storing of write data of a designated number of sectors, "14", in a memory area starting from a designated address "5055984". The command C5 indicates the storing of write data of a designated number of sectors, "16", in a memory area starting from a designated address "5060080". The command C6 indicates the storing of write data of a designated number of sectors, "32", in a memory area starting from a designated address "5052016".

When the cache memory in RAM 22 is full, the hard disk drive controller 21 stores the cached write data in the magnetic recording disk 31 (media write operation).

When the write command C4 is issued, and the cache memory in RAM 22 is full as showed in FIG. 3A, the hard disk drive controller 21 reorders the cached write data and begins to store the cached write data in the magnetic recording disk 31.

The hard disk drive controller 21 reorders the cached write data in the order of an address, and performs the media write operation.

For example, as showed in FIG. 3A, in the first media write operation, the write data of 128 sectors corresponding to the write command C3 are stored in the memory area starting from the address "5051888" of the magnetic recording disk 31.

In the second media write operation, the write data of 142 sectors corresponding to the write commands C1 and C4 are stored in the memory area starting from the address "5055856" of the magnetic recording disk 31. Since the write data corresponding to the write commands C1 and C4 are continuous with each other, the write data are combined into write data containing data of 142 sectors.

In the third media write operation, the write data of 128 sectors corresponding to the write command C2 are stored in the memory area starting from the address "5059952" of the magnetic recording disk 31.

It is appropriate to assume processing times as follows: seek time 3 ms, rotation wait time 4 ms, and media write time 1.28 ms for the first media write operation; seek time 3 ms, rotation wait time 4 ms, and media write time 1.42 ms for the second media write operation; seek time 3 ms, rotation wait time 4 ms, and media write time 1.28 ms for the first media write operation. The total processing time in this case is 24.98 ms.

After all cached write data are stored in the magnetic recording disk 31, the cache memory in RAM 22 is discharged and becomes ready to cache the next write data. Then, the hard disk controller 21 receives the next write commands C5–C9 from the upper rank system 2, and caches the next write data corresponding to the commands C5–C9 in the cache memory in RAM 22.

The hard disk drive controller 21 performs the media write operation in the following order.

As showed in FIG. 3B, in the fourth media write operation, the write data of 16 sectors corresponding to the write command C5 are stored in the memory area starting from the address "5060080" of the magnetic recording disk 31.

In the fifth media write operation, the write data of 32 sectors corresponding to the write command C6 are stored in the memory area starting from the address "5052016" of the magnetic recording disk 31.

Similarly, the write data designated by the write commands C7–C9 are stored in the respective memory areas of the magnetic recording disk 31.

The media write operation corresponding to the write command C5 can be assumed to require a seek time of 1 ms (to be explained below), a rotation wait time of 4 ms, and a media write time of 0.16 ms. The media write operation corresponding to the write command C6 also can be assumed to require a seek time of 3 ms, a rotation wait time of 4 ms, and a media write time of 0.32 ms. Accordingly, the total processing time would be 37.46 ms.

In this case, since the write data are stored in the memory area starting from the address "5059952" in the third media write operation, if the write data designated by the write command C5 are stored in the memory area starting from the address "5060080" before the write data designated by the write command C6, the seek time could be reduced. Therefore, in the above estimation of the total processing time, the seek time corresponding to the write command C5 is set at 1 ms instead of 3 ms.

The write cache function according to the related art, however, does not take it into account that the upper rank system 2 issues a write command file by file.

For example, the total processing time would be 25.46 ms if the following assumption is made: in the first media write operation, the write data of 144 sectors corresponding to the write commands C3 and C6 are stored in the memory area starting from the address "5051888" of the magnetic recording disk 31; in the second media write operation, the write data of 142 sectors corresponding to the write commands C1 and C4 are stored in the memory area starting from the address "5055856" of the magnetic recording disk 31; in the third media write operation, the write data of 160 sectors corresponding to the write commands C2 and C5 are stored in the memory area starting from the address "5059952" of the magnetic recording disk 31.

The following assumption on the processing times is further made: seek time 3 ms, rotation wait time 4 ms, and media write time 1.44 ms for the first media write operation; seek time 3 ms, rotation wait time 4 ms, and media write time 1.42 ms for the second media write operation; seek time 3 ms, rotation wait time 4 ms, and media write time 1.60 ms for the first media write operation. The total processing time in this case is 25.46 ms.

The total processing time, 25.46 ms, in this case is shorter than that of the prior case, 37.46 ms, by 12.14 ms.

This assumption, however, can not be implemented in practice because it does not take the memory capacity of the cache memory in RAM 22 that temporarily stores write data transferred from the upper rank system 2 into account.

In order to reduce the processing time of the media write operations, the hard disk drive controller 21 may be able to receive the write commands C5 and C6 while the write data corresponding to the first write command C3 are being stored in the magnetic recording disk 31, and store the write data corresponding to the write command C6 immediately after the write data corresponding to the write command C3 are stored by extending the media write operation.

The extension of the media write operation is, however, difficult from the technical stand point, and it is not known for sure whether the write command C6 is issued before the hard disk drive controller 21 finishes storing the write data corresponding to the write command C3 in the magnetic recording disk 31. This is also difficult to implement in practice.

SUMMARY OF THE INVENTION

Accordingly, it is a general object of the present invention to provide a novel and useful data storage apparatus and buffer controller in which one or more of the problems described above are eliminated.

Another and more specific object of the present invention is to provide a data storage apparatus and a method of storing data that efficiently store data in a recording medium, and an information processing system comprising said apparatus and using said medium.

In order to achieve the above objects according to the present invention, a data storage apparatus that stores a plurality of data series provided from an exterior in a recording medium, includes a buffer unit that temporarily stores said data series separately, and a control unit that identifies a group of said data series stored in said buffer unit that makes a series of data as a whole, combines said group of said data series, and stores the combined data series in said recording medium prior to the other data series stored in said buffer unit.

According to the present invention, the data series provided from the exterior are temporarily stored in the buffer unit, each data series separately. The control unit determines whether the group of the data series stored in the buffer unit is a series of data as a whole. If the group of the data series makes a series of data as a whole, the data series in the group are combined, and stored in the recording medium in a higher priority than (before) the other data series stored in the buffer unit.

Once the data series in the group are stored in the recording medium, the data series in the group are discharged from the buffer unit, and new data series are provided to the data storage apparatus from the exterior and stored in the buffer unit. The other data series stored in the buffer unit and the new data series, if they make a series of data as a whole, will be combined and stored in the recording medium.

Accordingly, because a plurality of data series are stored in the recording medium as a series of continuous data at a time, the seek time and the rotation wait time can be reduced, which results in an efficient data storage.

Other objects, features, and advantages of the present invention will become more apparent from the following detailed description when read in conjunction with the accompanying drawings.

BRIEF DESCRIPTION OF THE DRAWINGS

FIGS. 3A and 3B are schematic drawings showing the operation of the write processing according to the related art;

FIGS. 5A and 5B are schematic drawings showing the operation of the write processing as an embodiment of the present invention.

DETAIL DESCRIPTION OF THE PREFERRED EMBODIMENTS

Figure 1:
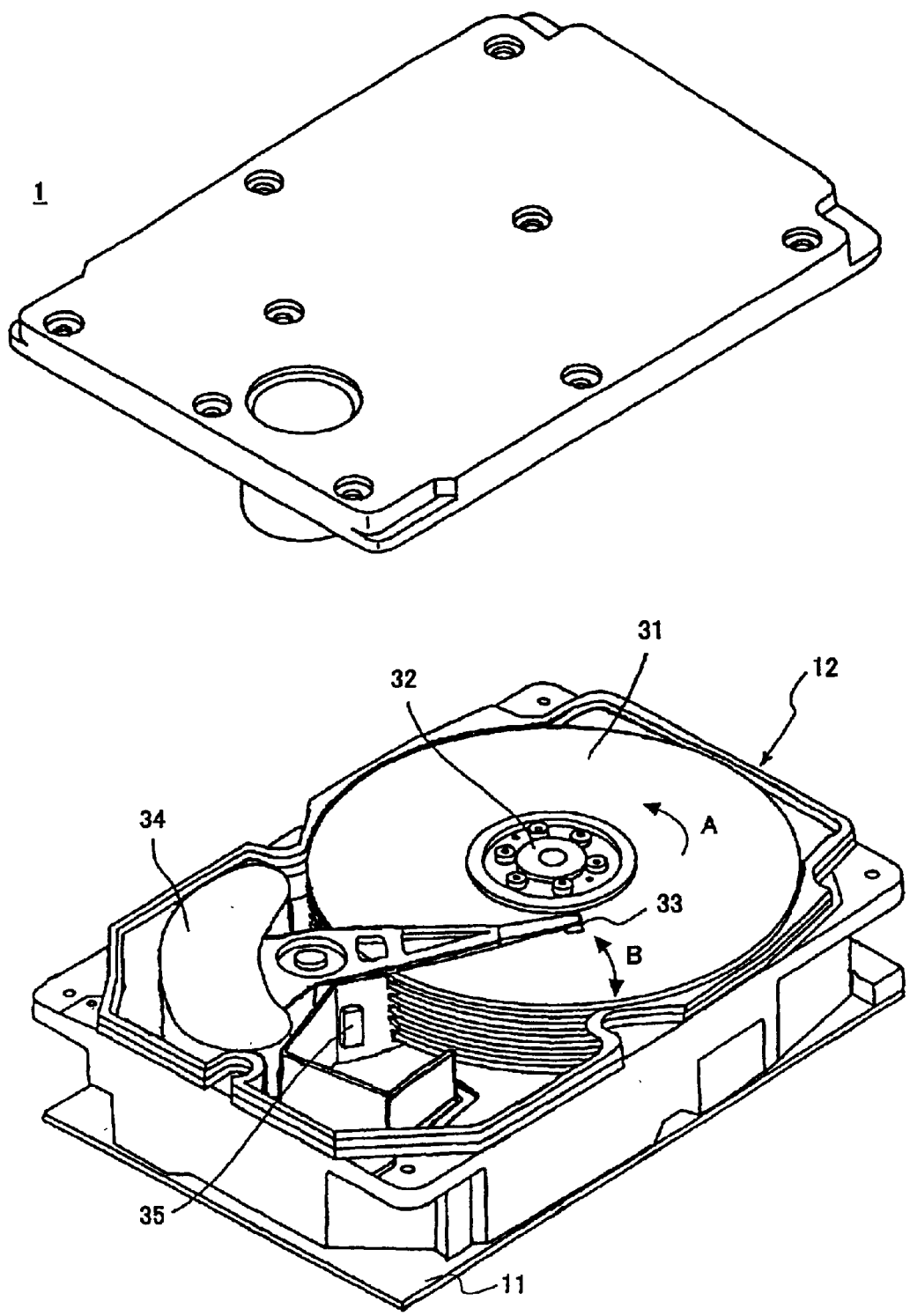
FIG. 1 is a schematic drawing showing a hard disk drive.
Figure 2:
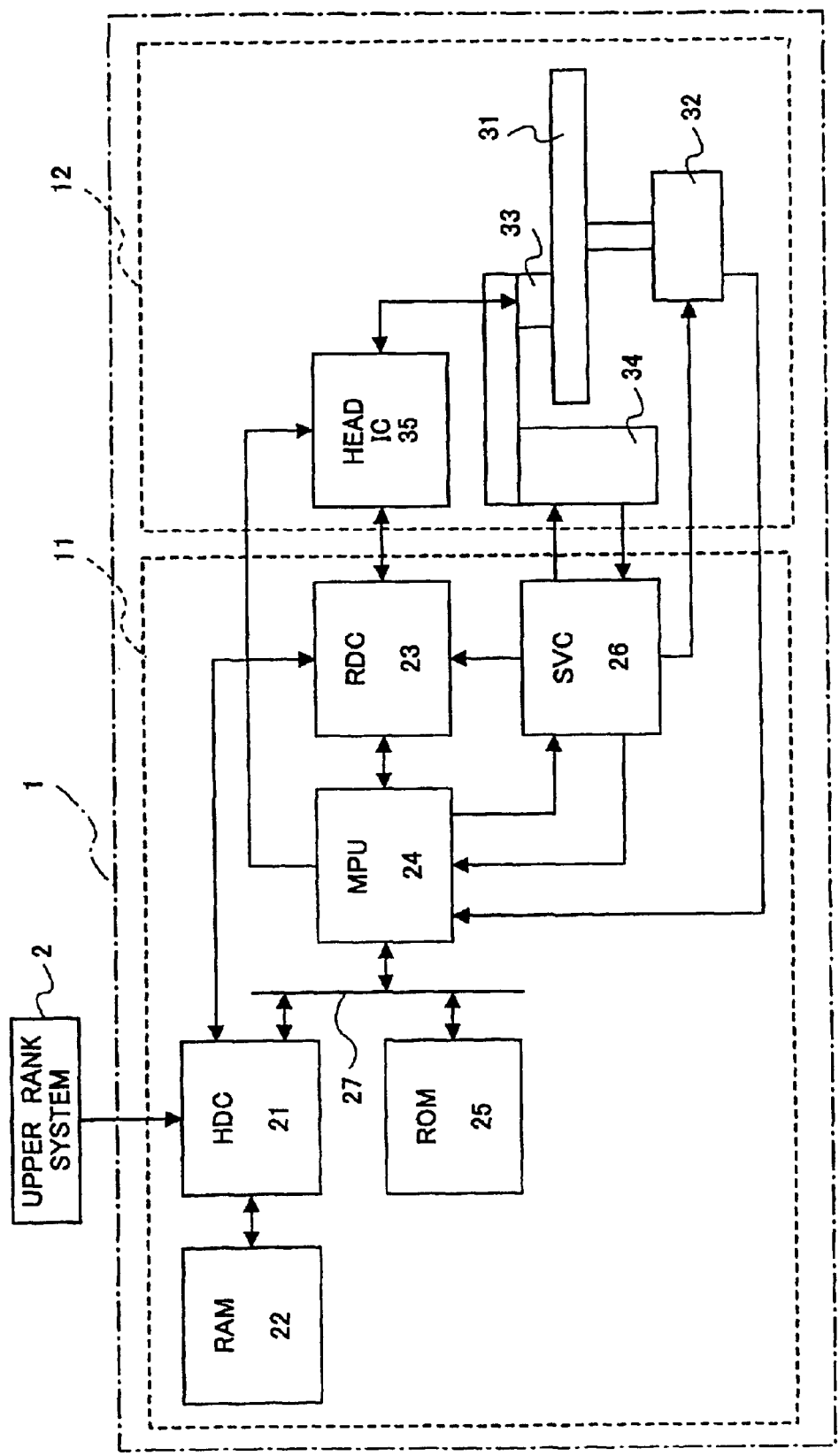
FIG. 2 is a block diagram showing the entire structure of a hard disk drive.
Figure 3B:
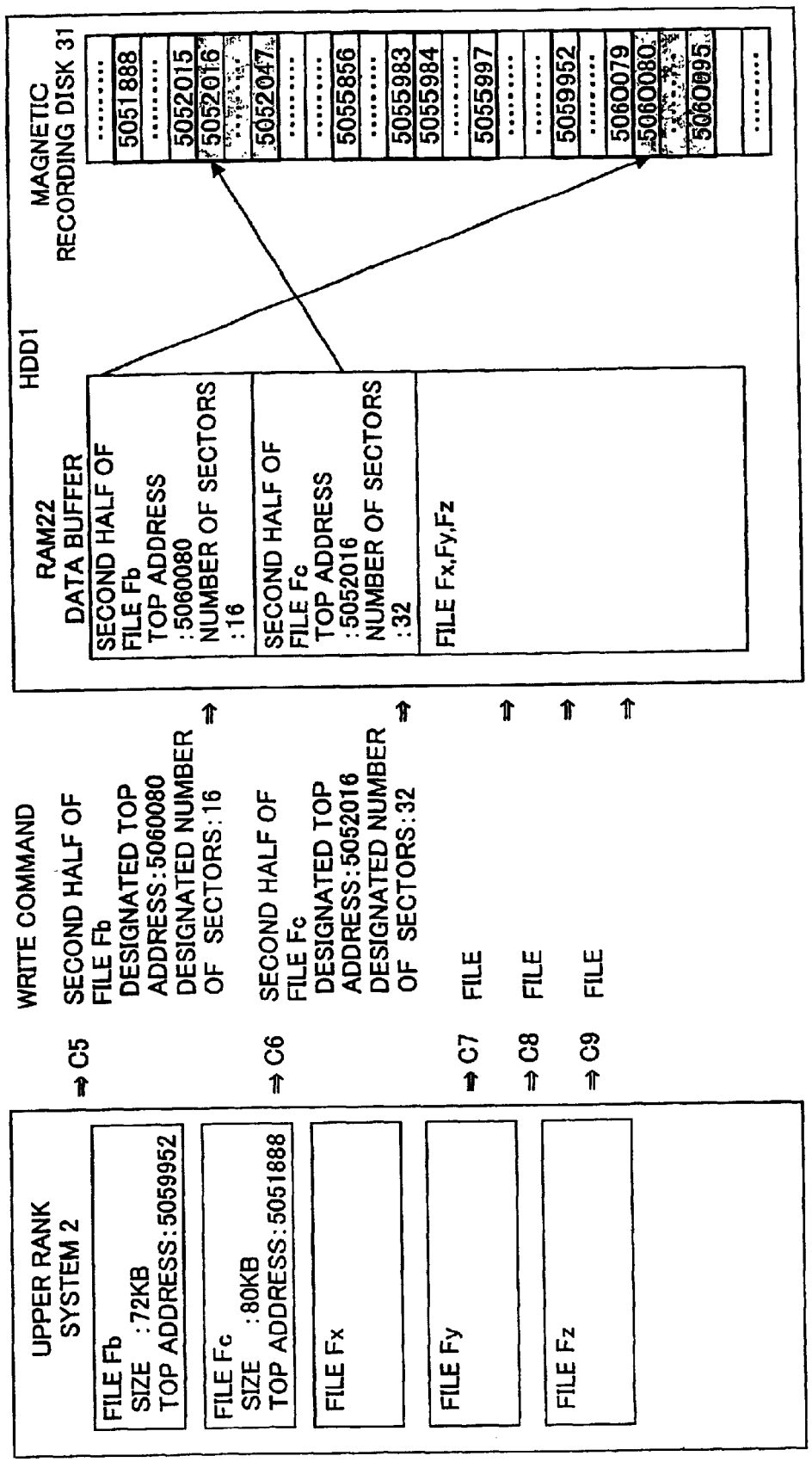

A hard disk drive as an embodiment of the present invention will be described below. The structure of the hard disk drive is identical to the hard disk drive 1 according to the related art described by reference to FIGS. 1 and 2 except for the write processing performed by the hard disk drive controller 21. Accordingly, the description of the structure of the hard disk drive as an embodiment of the present invention is omitted. Only the write processing of the hard disk drive will be explained.

Figure 4:
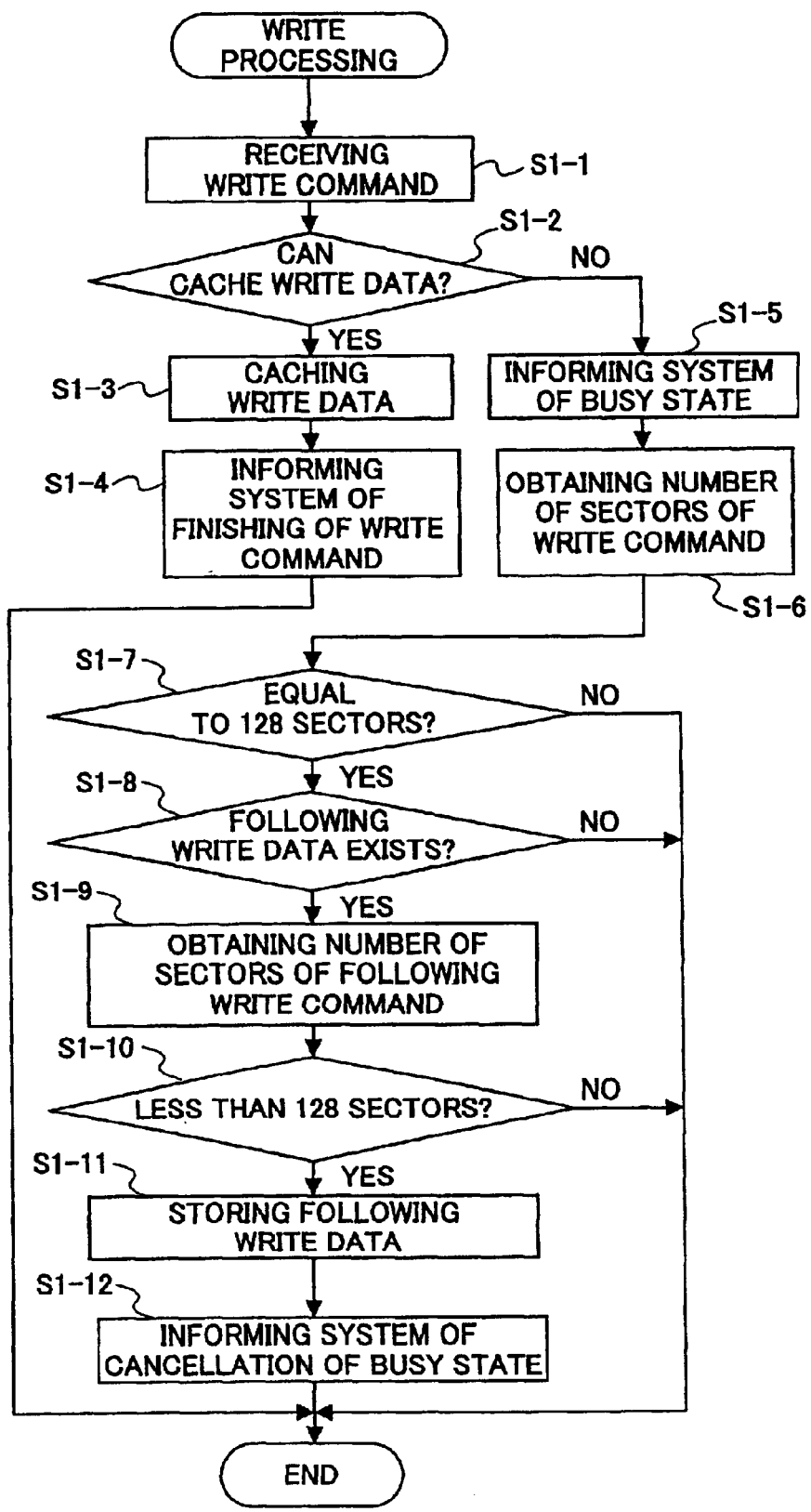
FIG. 4 is a flow diagram showing the write processing according to an embodiment of the present invention.

FIG. 4 is a flow diagram of the write processing as an embodiment of the present invention.

The hard disk drive controller 21 receives a write command from the upper rank system 2 (Step S1-1). In response to the receipt of the write command, the hard disk drive controller 21 determines whether the write data of the write command can be cached in the cache memory in RAM 22 by comparing the size of the write data with the unused memory area of the cache memory (Step S1-2).

If the unused memory area of the cache memory is large enough to cache the write data of the write command (Yes branch of Step S1-2), the hard disk drive controller 21 caches the write data of the write command in the cache memory in RAM 22 (Step S1-3). The hard disk drive controller 21 informs the upper rank system 2 of the completion of the write command (Step S1-4). The write processing is finished.

When the unused memory area of the cache memory in RAM 22 becomes less than a predetermined capacity or the data size of the write data of the write command, and the caching of the write data is consequently impossible (No branch of Step S1-2), the hard disk drive controller 21 informs the upper rank system 2 of a busy state. The hard disk drive controller 21 obtains the number of sectors of the write command (Step S1-6).

The hard disk drive controller 21 determines whether the number of sectors of the write command (hereinafter, called the first write command in the explanation of FIG. 4) is equal to 128 (Step S1-7). If the number of sectors of the first write command is 128 (Step S1-7), the hard disk drive controller 21 further determines whether another write command has write data that continuously follows the write data of the first write command (Step S1-8).

If another write command (hereinafter called the second write command in the explanation of FIG. 4) has write data that continuously follows the write data of the first write command (Step S1-8), the number of sectors of the write data of the second write command is obtained (Step S1-9).

The hard disk drive controller 21 determines whether the number of sectors of the write data of the second write command is less than 128 (Step S1-10). If the number of sectors of the write data of the second write command is less than 128 (Step S1-10), the continuous write data of both the first write command and the second write command are stored in the magnetic recording disk 31, that is, the hard disk drive controller 21 performs a media write operation for the continuous write data (Step S1-11).

If the number of sectors of the first write command is not equal to 128 (Step S1-7), if no other write command has write data that continuously follow the write data of the first write command (Step S1-8), or if the number of sectors of the write data of the second write command is not less than 128 (Step S1-10), the media write operation is not performed.

If the address in the magnetic recording disk 31 at which the write data of a received write command is to be stored is the same as the address at which the write data cached in RAM 22 is to be stored, the write data cached in RAM 22 are discharged and the write data of the received write command are cached in RAM 22.

Furthermore, if the write data of the first write command and the write data of the second write command are continuous, both write data are combined and stored in the magnetic recording disk 31 as a single series of write data. The media write operation is performed after sorting the cached write data in the order of an address in the magnetic recording disk 31.

Accordingly, since the write data of the first write command and the write data of the second write command are, if they are continuous, combined and stored in the magnetic recording disk 31, the seek time and the rotation wait time can be reduced and the media write is performed efficiently.

The write processing as an embodiment of the present invention will be described in detail below.

FIGS. 5A and 5B are schematic drawings showing the operation of the write processing as an embodiment of the present invention.

In this description, the upper rank system 2 has six files Fa, Fb, Fc, Fx, Fy, and Fz to be stored in the magnetic recording disk 31 of the hard disk drive 1.

A file Fa contains data of 71 KB to be stored in a memory area starting with the address "5055856" in the magnetic recording disk 31. A file Fb contains data of 72 KB to be stored in a memory area starting with the address "5059952" in the magnetic recording disk 31. A file Fc contains data of 80 KB to be stored in a memory area starting with the address "5051888" in the magnetic recording disk 31.

Because the file Fa contains data of 71 KB, which is greater than 64 KB that is beyond the file size a write command can handle, the upper rank system 2 issues a write command C11 with which the hard disk drive controller 21 stores write data of 128 sectors in the magnetic recording disk 31 and a write command C14 with which the hard disk drive controller 21 stores write data of 14 sectors in the magnetic recording disk 31.

Since the file Fb contains data of 72 KB, which is greater than 64 KB that is beyond the file size a write command can handle the upper rank system 2 issues two write commands C12 and C15 that store write data of 64 KB (128 sectors) and 8 KB (16 sectors), respectively, to store the file Fb in the magnetic recording disk 31.

Because the file Fc contains data of 80 KB, which is greater than 64 KB that is beyond the file size a write command can handle the upper rank system 2 issues two write commands C13 and C16 that store write data of 64 KB (128 sectors) and 16 KB (32 sectors), respectively, to store the file Fc in the magnetic recording disk 31.

It should be noted that the upper rank system 2 does not necessarily issue write commands indicating a series of write data (C11 and C14, for example). FIGS. 5A and 5B indicate the case where the write commands are issued in the order of C11–C16.

The write command C11 indicates the storing of write data of a designated number of sectors, "128", in a memory area starting from a designated address "5055856". The write command C12 indicates the storing of write data of a designated number of sectors, "128", in a memory area starting from a designated address "5059952". The write command C13 indicates the storing of write data of a designated number of sectors, "128", in a memory area starting from a designated address "5051888".

The write command C14 indicates the storing of write data of a designated number of sectors, "14", in a memory area starting from a designated address "5055984". The write command C15 indicates the storing of write data of a designated number of sectors, "16", in a memory area starting from a designated address "5060080". The write command C16 indicates the storing of write data of a designated number of sectors, "32", in a memory area starting from a designated address "5052016". All the write commands C11–C16 are provided by the upper rank system 2 to the hard disk drive 1.

Receiving the write command C14, the hard disk drive controller 21 begins reordering and performing the media write operation.

According to the write processing as an embodiment of the present invention, the media write operation is performed as follows.

The write data of the write command C11 and the write data of the write command C14 are combined and stored in the 142 sectors starting from the address "5055856" in the magnetic recording disk 31 as indicated by the steps S2-1 and S2-2 in FIG. 5A. That is, the file Fa has been stored in the magnetic recording disk. Since the files Fb and Fc are not cached completely in RAM 22, those files are not stored in the magnetic recording disk in this media write operation.

After being stored in the magnetic recording disk 31, the write data of the write command C11 and the write data of the write command C14, both cached in RAM 22 occupying the cache memory area corresponding to 142 sectors in total are discharged, and the cache memory area is ready to cache the next write data. The hard disk drive controller 21 cancels the busy state.

In response to the cancellation of the busy state, the upper rank system 2 transfers the next command C15.

The hard disk controller 21 caches the write data of the write command C15 in the cache memory area of RAM 22. Because the cache memory still has unused area of 126 sectors, the hard disk drive controller 21 does not inform the upper rank system 2 of a busy state. Since the hard disk drive controller 21 does not indicate a busy state, the upper rank system 2 provides the next write command C16 to the hard disk drive controller 21.

The hard disk drive controller 21 receives the write command C16, and caches the write data of the command C16 in the cache memory area of RAM 22. Since the write data of the write command C16 is 32 sectors, the cache memory of RAM 22 still has unused area of 94 sectors(=126 sectors–32 sectors). The hard disk drive controller 21 does not perform the media write operation and does not inform the upper rank system 2 of a busy state.

The upper rank system 2 sequentially transfers the write commands C17, C18, and C19 to the hard disk drive controller 21 until the hard disk drive controller 21 informs the upper rank system 2 of a busy state, that is, the cache memory in RAM 22 cannot cache the write data.

When the hard disk drive controller 21 becomes unable to cache the write data of the next write command after caching the write data of the write commands C17, C18, and C19, the hard disk drive controller 21 informs the upper rank system 2 of the busy state. The upper rank system 2 stops, in response to a receipt of the busy state, the transferring of another write command.

The hard disk drive controller 21 stores the write data cached in RAM 22 in the magnetic recording disk 31, that is, performs a media write operation. When the hard disk drive controller 21 receives the write commands C15 and C16, the entire write data of the write command C15 (the file Fb) and the entire write data of the write command C16 (the file Fc) are cached in RAM 22.

Accordingly, as indicated by the steps S2-3 and S2-4 in FIG. 5B, the write data of the write command C14 and the write data of the write command C16, both jointly forming the file Fc having upper addresses, are combined and stored in the 144 sectors starting from the address "5051888" in the magnetic recording disk 31.

In the steps S2-5 and S2-6 indicated in FIG. 5B, the write data of the write command C12 and the write data of the write command C15, both jointly forming the file Fb having lower addresses, are combined and stored in the 160 sectors starting from the address "5059952" in the magnetic recording disk 31.

As described above, the write processing according to the present invention stores the write data, which in conventional systems is stored separately, as a series of continuous write data. Accordingly, the write processing reduces the total processing time by decreasing the seek time and the rotation wait time.

The total processing time can be estimated as follows.

The total processing time is a sum of the time required for the media write operation of a series of write data of 142 sectors starting from the address "5055856" obtained by combining the write data of the write command C11 and the write data of the write command C14, the time required for the media write operation of a series of write data of 144 sectors starting from the address "5051888" obtained by combining the write data of the write command C13 and the write data of the write command C16, and the time required for the media write operation of a series of write data of 160 sectors starting from the address "559952" obtained by combining the write data of the write command C12 and the write data of the write command C15.

The media write operation of a series of write data of 142 sectors starting from the address "5055856" obtained by combining the write data of the write command C11 and the write data of the write command C14 requires a seek time of 4 ms, a rotation wait time of 4 ms, and a media write time of 1.42 ms, 9.42 ms in total.

The media write operation of a series of write data of 144 sectors starting from the address "5051888" obtained by combining the write data of the write command C13 and the write data of the write command C16 requires a seek time of 3 ms, a rotation wait time of 4 ms, and a media write time of 1.44 ms, 8.44 ms in total.

The media write operation of a series of write data of 160 sectors starting from the address "5059952" obtained by combining the write data of the write command C12 and the write data of the write command C15 requires a seek time of 4 ms, a rotation wait time of 4 ms, and a media write time of 1.60 ms, 9.60 ms in total.

Accordingly, the total processing time becomes 27.46 ms(=9.42 ms+8.44 ms+9.60 ms). The write processing as an embodiment of the present invention, the total processing time can be reduced by 10 ms from the total processing time 37.46 ms according to the related art.

This description of an embodiment is given based on a hard disk drive as an example of the data storage apparatus according to the present invention. The present invention, however, is not limited to a hard disk drive, but various data storage apparatuses that utilize a write cache function to perform media write.

The preferred embodiments of the present invention are described above. The present invention is not limited to these embodiments, but various variations and modifications may be made without departing from the scope of the present invention.

This patent application is based on Japanese priority patent application No. 2001-378426 filed on Dec. 12, 2001, the entire contents of which are hereby incorporated by reference.

What is claimed is:

1. A data storage apparatus that stores a plurality of data series provided from an exterior system in a recording medium, comprising:
   a buffer unit that temporarily stores the data series; and
   a control unit that:
      identifies a group of the data series stored in said buffer unit, the group of the data series forming a series of data as a whole,
      determines an order in which the data series stored in said buffer unit are stored in the recording medium by examining designated sector numbers corresponding to each data series, wherein the identified group of the data series is stored prior to other data series; and
      stores the data series in the recording medium in the determined order.

2. The data storage apparatus as claimed in claim 1, wherein said control unit identifies the group of the data series when an unused memory area of said buffer unit becomes smaller than a predetermined data size.

3. A data storage apparatus that stores, in a recording medium, a plurality of data blocks provided from an exterior system, each data block being smaller than a predetermined data size, comprising:
   a buffer unit that temporarily stores the data blocks; and
   a control unit that:
      identifies the data blocks that are consecutive parts of a data file of the exterior system,
      determines an order in which the data blocks stored in said buffer unit are stored in the recording medium by examining designated sector numbers corresponding to each data block, wherein the identified data blocks that are consecutive parts of the data file of the exterior system, and
      stores the data blocks in the recording medium in the determined order.

4. The data storage apparatus as claimed in claim 3, wherein said control unit identifies the data blocks that are consecutive parts of the data file when an unused memory area of said buffer unit becomes smaller than a predetermined data size.

5. The data storage apparatus as claimed in claim 2, wherein said control unit does not store the data series in the recording medium until the unused memory area of said buffer unit becomes smaller than the predetermined data size.

6. The data storage apparatus as claimed in claim 4, wherein said control unit, after the identified data blocks that are consecutive parts of the data file of the exterior system are stored in the recording medium, leaves the other data blocks in said buffer unit, discharges the identified data blocks stored in said buffer unit, and stores other data blocks provided from the exterior system in an unused memory area of said buffer unit.

7. The data storage apparatus as claimed in claim 3, wherein said control unit determines the order in which the data blocks stored in said buffer unit are stored in the recording medium by determining whether the designated sector is a multiple of a unit configuring a memory space of the exterior system.

8. A buffer controller that stores a plurality of data series provided from an exterior system in a buffer memory and transfers said data series to a recording medium, comprising:
   a control unit that:
      identifies a group of the data series stored in said buffer memory, the group of the data series forming a series of data as a whole,
      determines an order in which the data series stored in said buffer unit are stored in the recording medium by examining designated sector numbers corresponding to each data series, wherein the identified group of the data series is stored prior to other data series; and
      transfers the data series to the recording medium in the determined order.

9. The buffer controller as claimed in claim 8, wherein said control unit identifies the group of the data series when an unused memory area of said buffer memory becomes smaller than a predetermined data size.

10. A buffer controller that stores a plurality of data blocks provided from an exterior system, each data block being smaller than a predetermined data size, in a buffer memory and transfers the data blocks to a recording medium, comprising a control unit that identifies the data blocks temporarily stored in said buffer memory that are consecutive parts of a data file of the exterior system, and transfers the data file to the recording medium in the predetermined order, wherein said control unit identifies the data blocks that are consecutive parts of the data file when an unused memory area of said buffer memory becomes smaller than a predetermined data size.

11. The data storage apparatus as claimed in claim 9, wherein said control unit does not transfer the data series to the recording medium until the unused memory area of said buffer memory becomes smaller than the predetermined data size.

12. The buffer controller as claimed in claim 10, wherein said control unit, after the identified data blocks that are consecutive parts of the data file of the exterior system are transferred to the recording medium, leaves the other data blocks in said buffer memory, discharges the identified data blocks stored in said buffer memory, and stores other data blocks provided from the exterior system in an unused memory area of said buffer memory.

13. The data storage apparatus as claimed in claim 10, wherein said control unit determines the order in which the data blocks stored in said buffer unit are stored in the recording medium by determining whether the designated sector is a multiple of a unit configuring a memory space of the exterior system.

14. A method of storing a plurality of data series provided from an exterior system in a recording medium by temporarily storing the data series in a buffer, comprising:
   a step of storing the data series in said buffer;
   a step of identifying a group of the data series stored in said buffer the group of the data series forming a series of data as a whole;
   a step of determining an order in which the data series stored in said buffer unit are stored in the recording medium by examining designated sector numbers corresponding to each data series, wherein the identified group of the data series is stored prior to other data series; and
   a step of storing the data series in the recording medium in the determined order.

* * * * *